Patented Feb. 23, 1943

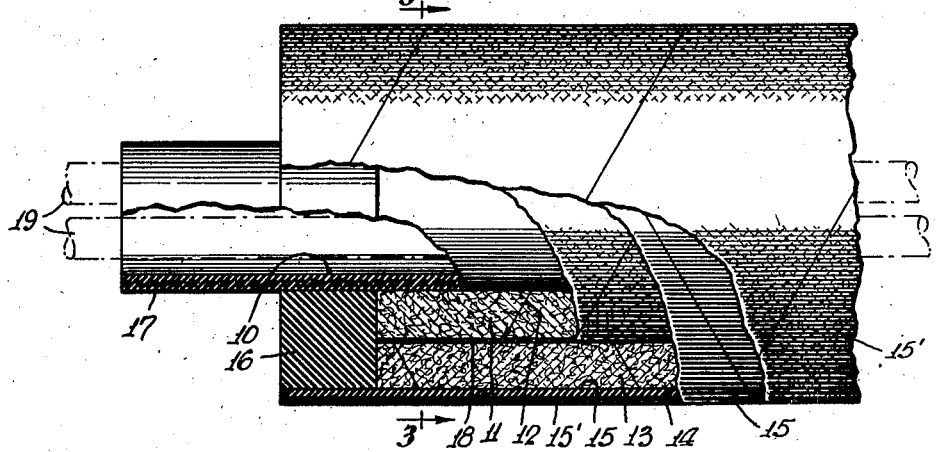
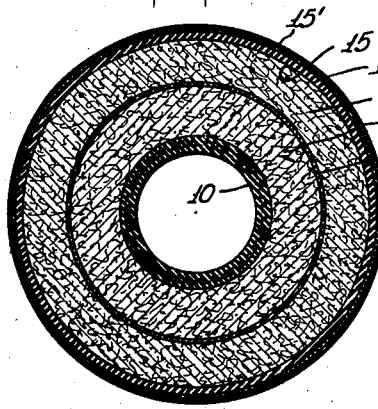
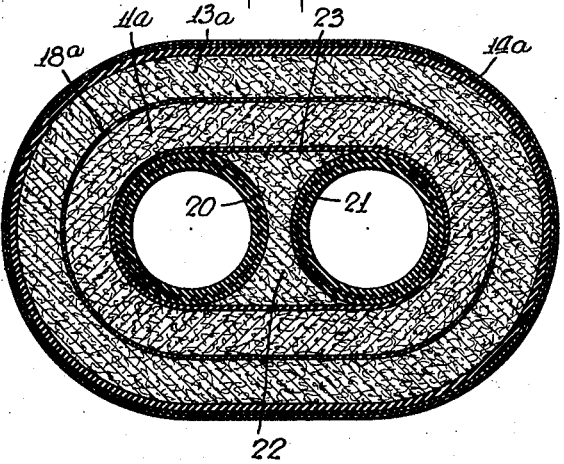

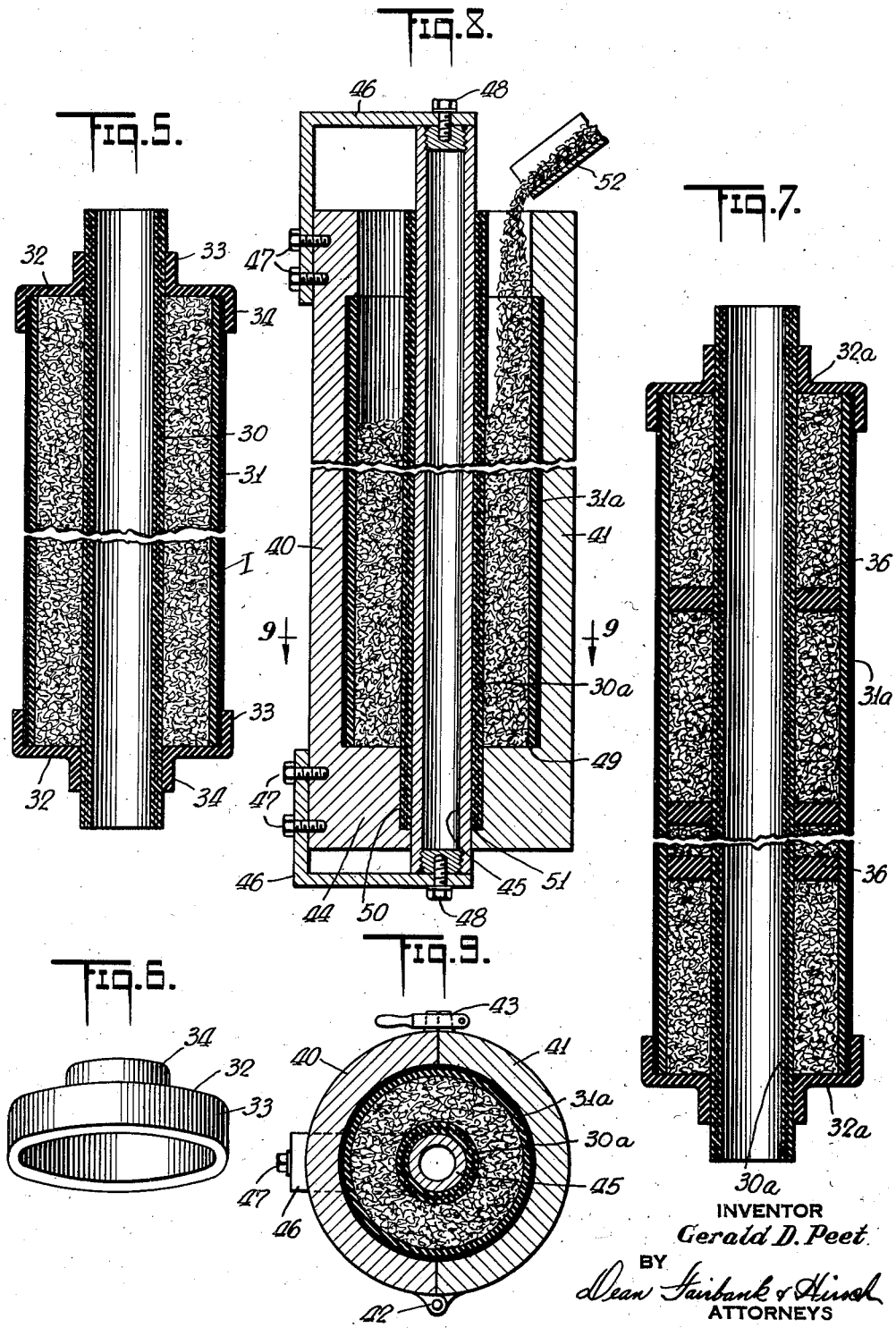

2,312,282

UNITED STATES PATENT OFFICE 2,312,282

HEAT INSULATING FLUID CONDUCTOR

Gerald D. Peet, Montclair, N. J., assignor to Novadel-Agene Corporation, Newark, N. J., a corporation of Delaware Application October 10, 1939, Serial No. 298,753

4 Claims. (Cl. 138—55)

The present invention relates to heat insulating fluid conductors, more especially of the flexible type.

As conducive to a clear understanding of the invention it is noted that prefabricated segmental or tubular insulating pipe enclosures are in general adapted mainly for permanent pipe installations and moreover present a multiplicity of joints which are difficult to keep moisture tight. The weight of prefabricated insulation is ordinarily moreover difficult to support upon a plurality of small conduits of low structural strength where the latter are to be encircled thereby. The use of flexible heat insulating covering material of sponge rubber is usually limited for use on very small conduits and the attempt to utilize it for larger conductors is costly, and since the material is available only in small pieces a multiplicity of exposed joints would result with the difficulty above noted.

It is among the objects of the present invention to provide prefabricated fluid conductors of any desired diameter which shall be inexpensive and rugged in construction, which incorporates effective heat insulation as a unitary part of the structure thereof and is adapted to be connected up with substantially the facility with which ordinary pipe may be installed.

Another object is to provide a heat insulating conductor of the type mentioned which admits of ready flexure despite a relatively thick covering of heat insulation, and in which despite such flexure, the effectiveness of the heat insulation is not impaired either by affording a path for ingress of moisture or by shift of insulation from the flexed region.

In the accompanying drawings in which are shown one or more of various possible embodiments of the several features of the invention, Fig. 1 is a perspective view of the finished product in one embodiment thereof, Fig. 2 is a side view on a larger scale with parts broken away and parts in section illustrating the details of the construction, Fig. 3 is a transverse sectional view taken on line 3—3 of Fig. 2, Fig. 4 is a view similar to Fig. 3 of a modification, Fig. 5 is a view in longitudinal cross-section of a modified form of the invention, Fig. 6 is a perspective view of a closure cap for finishing a severed section thereof, Fig. 7 is a view similar to Fig. 5 of a further modification, Fig. 8 is a view longitudinal cross-section of an apparatus for assembling the flexible heat insulating conductor such as shown in Figs. 5 and 7, and Fig. 9 is a view in transverse cross-section taken on line 9—9 of Fig. 8.

Referring now to Figs. 1 to 3 of the drawings, the conductor includes a carcass or hollow core 10 of hose which is preferably flexible but not distendible in its normal diameter and is of rubberized fabric, comprising rubber reinforced by a plurality of plies of woven fibrous material, rubber frictioned duck, cotton sheeting or the like. The term "rubber" as used in the specification and claims also includes various rubber-like materials including synthetic rubber.

The rubber carcass is snugly embraced by a jacket 11 of insulating material which may be of jute, cotton, hair-felt, glass-wool, asbestos, rock wool or other material. Desirably this material in strip form is wound from a reel and is applied about the rubber carcass in butt-wound helical conformation as at 12. Preferably a second similar jacket 13 of the insulating material is wound about the first jacket but in opposed direction so that the helical lines of edge contact of the strip convolutions cross each other. If desired the heat insulation may extend as a braid snugly about the carcass. In accordance with requirements there may be three, four or more successive layers of insulating material wound in alternately in opposed directions. The heat insulating jacket is desirably of thickness considerably greater than the wall of the carcass.

Encircling the insulation is a seal in the form of a flexible sleeve, jacket or enclosure 14, which may be slipped over the insulation, or wrapped around the insulation in a single sheet with the longitudinal edges cemented together, but is preferably wound in the form of a spiral strip with overlapping edges. The sleeve jacket or enclosure 14 may consist of an inner layer of rubber or rubberized fabric 15 over which one or more plies of rubberized fabric 15' such as rubber frictioned cotton sheeting, may, if desired, be applied. The two or more layers of the composite sleeve or jacket 14 are desirably wound in opposed relation as shown.

Means is desirably provided to effect a liquid-tight closure for the ends of the heat insulating jacket, said means being generally annular in construction and being bonded to the carcass at its inner periphery and to the outer sleeve at its outer periphery. Preferably the carcass protrudes at its extremities beyond the heat insulating jacket and beyond the outer sleeve and the closure embraces the carcass and is in peripheral engagement with the flexible outer sleeve.

In the particular embodiment shown in the drawings, the rubber carcass, as well as the outer composite enclosure 14, both protrude beyond the corresponding ends of the heat insulation 12, 13. A thick centrally perforated disk 16 snugly embraces the protruding end 17 of the carcass and snugly fits at its outer periphery within the rubber enclosure 14 and preferably abuts the ends of the heat insulation. Desirably the disk is sealed at its inner and outer periphery respectively to the carcass and the enclosure, thereby to afford a complete enclosure for the heat insulating material, liquid-tight at all points.

Ordinarily the end disks 16 will be largely or entirely of rubber as are the carcass 10 and the outer jacket 14. Such rubber is preferably vulcanized after the assembly above set forth, so that the parts become bonded together in a unitary structure presenting a completely enclosed hollow jacket which enseals the heat insulation.

It is preferred to interpose between successive layers of the composite heat insulating jacket as for instance at 18 one or more sleeves of flexible rubber similar to the rubber enclosure element 14. Such intermediate enclosure helps not only to bind the layer of heat insulation enclosed therein more firmly with respect to the underlying structure, but also serves as a secondary moisture seal to protect the insulation even if the outer or primary moisture seal in the form of rubber enclosure 14 should become mechanically injured.

Thus a construction is provided in which the heat insulating efficacy will not be impaired due to flexure in the course of application or use, or otherwise, as for instance by localized displacement of insulation or by entry of moisture. It is of course understood that prior to the application of the rubber enclosures, the heat insulating material should be thoroughly dried so that no moisture will be enclosed therewith in the hollow rubber jacket therefor.

Where the heat insulation is made of prefabricated sections involving a multiplicity of joints, the entry of moisture through such joints is difficult to guard against. Such moisture acts as a heat conductor and would greatly impair or destroy the efficacy of the heat insulation. By the present invention, the heat insulation is so thoroughly and completely ensealed within a liquid tight enclosure that its efficacy is preserved indefinitely.

While the rubber carcass can itself be used as the fluid conduit, it will also be evident that one or more pipes illustratively indicated in dot and dash lines at 19 may serve as the primary fluid conductors, the rubber carcass serving as the core for the heat insulation thereabout.

Thus it will be seen that the units, preferably made up in standardized lengths of several feet, with the extremities of the carcass protruding as at 17 may be readily connected in any of a wide variety of installations and especially in such where the heat insulating section is subject to movement in use, as for instance for connection and disconnection as in beer dispensing systems or to permit mechanical vibration as in steam or refrigerating conduits associated with moving machinery.

In the embodiment of Fig. 4 is shown a construction in which a single enclosure houses two or more separate and distinct rubber carcasses 20 and 21. In such arrangement the rubber carcasses in generally parallel relation have loose insulating material 22 interposed therebetween and are assembled by tape, illustratively adhesive tape 23 encircling the same. The entity thus made up of two or more rubber carcasses, is encased, desirably in composite insulating jackets with an outer rubber enclosure and desirably also one or more intermediate rubber enclosures corresponding closely to the disclosure of Figs. 1, 3. The corresponding parts bear the same reference numerals as in Figs. 1 and 3 with suffix. The respective jackets in this embodiment are not circular but generally elongated or oval in shape as shown. The disks (not shown) corresponding to disks 16 will of course be generally oval in the outline shown in Fig. 4 when two carcasses are used.

In the embodiment of Fig. 5, the carcass or core 30 is encircled by a rubber jacket 31 preferably also of rubberized fabric, which is maintained in coaxial relation therewith by end closures 32, illustratively shown in the form of annular caps, each with an outer flange 23 overlapping the jacket and an oppositely turned flange 34 at the inner periphery, snugly overlapping the core, which protrudes somewhat beyond the jacket.

While the annular jacket between the coaxial cylindrical structures and the end caps, may in some applications be left empty for the air therebetween to serve as the sole insulator, it is preferred to fill this space with insulating material I such as jute, cotton, hair-felt, glass wool, shredded asbestos, rock wool or the like. This may be introduced through the open end of the structure and after the filler is tightly tamped, the outer cap 32 may be applied.

In a preferred construction, the various parts including caps 32 are wholly or largely of rubber so that the various elements may be bonded into a unitary structure by vulcanizing the same.

The insulating tube may be made in sections of any desired length. Where a length thereof shorter than that in which it is fabricated is to be employed, an appropriate length of conductor may be cut off, the cut of the core being desirably somewhat beyond the cut of the jacket to provide the desired extension. After repacking the insulation or packing in additional insulation, a closure such as shown in Fig. 6, which is substantially a duplicate of those shown at 32 in Fig. 5 is applied about the severed end of the core to embrace the severed end of the jacket and this cap would be cemented in place.

The embodiment of Fig. 7 is a modification of that of Fig. 5, which is especially suited for sections of insulating conductor having considerable length. In this case, rings 36 having considerable stiffness are distributed over the length of the conductor, snugly to fill the annular space between the core and the jacket. Illustratively these rings may be disposed about a foot apart. Preferably the insulating material below each ring is tightly tamped before the ring is applied and forced down upon the insulating material therebelow. Preferably rings 36 are of rubber, and after the complete assembly of the conductor with its caps 32ª at the respective ends thereof, is vulcanized, so as to bond all of the rubber elements into a unitary structure.

It will be understood that the rubber rings 36 substantially guard against displacement of the packed insulating material, which might otherwise occur when the hose is given a relatively sharp turn. Thus the filling material will not become displaced and the rubber jacket will not contact the rubber carcass.

In Figs. 8 and 9 is shown an apparatus to facilitate the production of the insulated flexible conductor shown in Fig. 5 or 7. This apparatus comprises a longitudinally split cylindrical case, the semi-cylindrical shells of which are shown at 40 and 41. These are hinged together as at 42 and adapted to be held snugly closed by one or more clamps 43. The cylindrical case is of diameter snugly to be engaged by the jacket 31ª of the hose to be assembled therein. The case is provided with a unitary bottom, each semicylindrical section of the shell having a semi-circular end 44 which, however, is notched or cut out at the middle to accommodate a mandrel 45 extending the entire length of and beyond the shell. That mandrel is secured in position by brackets 46 at the opposite ends thereof secured by screws 47 to the case and by screws 48 to the respective ends of the mandrel. The bottom wall 44 of the shell affords a rest for the lower extremity 49 of the jacket 31ª for the hose and the mandrel constitutes a support for the core or carcass 30ª of the hose, the lower end of which extends into a corresponding enlargement 50 in the notch of the bottom wall and rests upon a shoulder 51 therein. The insulating material is poured into the annular space between the core 30ª and the shell 31ª by a scoop 52 or the like, and is tamped into position or where desired, the spacer rings 36 of the embodiment of Fig. 7 might be introduced in the course of assembly. The insulating material is tightly packed into position until the annular space is completely filled. Thereupon the case 40—41 is opened and the assembly may be removed, the tightly packed insulation remaining in position between the core and the jacket even though the ends thereof are open. Thereupon the end caps shown in Fig. 5 are applied and vulcanized or cemented in place to complete the assembly.

It will be understood that if desired an insulating closure plug such as shown at 16 in Fig. 2 could be used in the assembly in place of the cap shown in Fig. 5. Such closure could be introduced into the apparatus of Fig. 8, by forcing the same about the core 30ª and into the case 40—41 until it bottoms on the floor 44 of the core. Thus any possibility of the subsequently introduced and tamped insulating material dropping out in part is guarded against in the handling of the assembly after removal from the apparatus of Fig. 8. The other cap or plug would then be readily inserted into the open top of the insulation filled assembly, and the whole may then be vulcanized as previously set forth.

The use of the term "heat insulating conductor" in the specification and claims is broadly directed not only to conductors suitable for hot liquids, gases or vapors to be guarded against cooling, but is also directed to conductors for cold liquids, gasses or vapors to be thereby protected against becoming warm. The invention is also applicable and efficacious for conductors used for conveying liquids or gases to be maintained in the course of flow at any predetermined temperature. The invention is applicable to conveying a wide variety of liquids, gases or vapors and the carcass would be made of material or lined with material such as to withstand any corrosive action of the fluid coursing therethrough.

While in its preferred application as above noted, the invention is directed to flexible conductors, it will be understood that in its broader aspects as defined in certain of the broader claims, it is also applicable to the heat insulation of rigid pipe lines.

As many changes could be made in the above construction and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent is:

1. A pre-fabricated flexible fluid conductor comprising a flexible hose carcass composed of fabric and rubber, a flexible jacket thereabout of heat insulating material and of thickness substantially greater than the wall thickness of the carcass, a flexible sleeve enclosing the insulating jacket, and including rubber in its composition, said sleeve being affixed with respect to said carcass.

2. The combination recited in claim 1 in which both the carcass and the sleeve protrude beyond the ends of the flexible jacket, and in which means is provided to effect a substantially liquid-tight closure of each end of the sleeve with respect to the corresponding end of the carcass, with the length of the jacket confined between said closures.

3. A heat insulating flexible fluid conductor comprising a flexible tubular core, a jacket thereabout of heat insulating material of thickness substantially greater than the wall thickness of the tubular core, the ends of the latter extending beyond the ends of said jacket, a flexible sleeve enclosing the insulating jacket and protruding beyond the ends thereof, each end of the conductor having an end seal of generally annular conformation embracing the core at its inner periphery and embraced at its outer periphery by the outer sleeve, said end seals being bonded both to said core and to said sleeve.

4. The combination recited in claim 3 in which the tubular core is a hose carcass composed of fabric and rubber, the flexible sleeve includes rubber in its composition, and the end seals are of rubber and are vulcanized at both said carcass and said sleeve.

GERALD D. PEET.